US011146650B2

(12) United States Patent
Lin

(10) Patent No.: US 11,146,650 B2
(45) Date of Patent: Oct. 12, 2021

(54) TRAFFIC INFORMATION INTERACTION SYSTEM AND TRAFFIC INFORMATION INTERACTION METHOD

(71) Applicants: LITE-ON ELECTRONICS (GUANGZHOU) LIMITED, Guangzhou (CN); Lite-On Technology Corporation, Taipei (TW)

(72) Inventor: Chang-Yi Lin, Taipei (TW)

(73) Assignees: LITE-ON ELECTRONICS (GUANGZHOU) LIMITED, Guangzhou (CN); Lite-On Technology Corporation, Taipei (TW)

(*) Notice: Subject to any disclaimer, the term of this patent is extended or adjusted under 35 U.S.C. 154(b) by 295 days.

(21) Appl. No.: 16/438,493

(22) Filed: Jun. 12, 2019

(65) Prior Publication Data
US 2019/0378409 A1 Dec. 12, 2019

(30) Foreign Application Priority Data
Jun. 12, 2018 (CN) .......................... 201810599003.X

(51) Int. Cl.
G08G 1/095 (2006.01)
H04W 4/44 (2018.01)
(Continued)

(52) U.S. Cl.
CPC ............ *H04L 67/26* (2013.01); *G08G 1/00* (2013.01); *G08G 1/005* (2013.01); *G08G 1/087* (2013.01);
(Continued)

(58) Field of Classification Search
None
See application file for complete search history.

(56) References Cited

U.S. PATENT DOCUMENTS

2002/0154031 A1\* 10/2002 Chan ..................... G08G 1/095
340/907
2003/0101303 A1\* 5/2003 Kung .................... G06F 1/1626
710/301
(Continued)

FOREIGN PATENT DOCUMENTS

CN 202917002 5/2013
CN 104036642 9/2014
(Continued)

OTHER PUBLICATIONS

"Office Action of Taiwan Counterpart Application", dated Mar. 10, 2020, p. 1-p. 9.

*Primary Examiner* — John F Mortell
(74) *Attorney, Agent, or Firm* — JCIPRNET

(57) ABSTRACT

A traffic information interaction system is provided. The system includes a plurality of lighting apparatuses and a first electronic device. Each of the lighting apparatuses emits light according to received power, so as to indicate whether a corresponding path is passable with the emitted light. In addition, each of the lighting apparatuses further pushes information. The first electronic device generates a request according to received information, and transmits the request to a target lighting apparatus of the lighting apparatuses. The target lighting apparatus adjusts target information pushed by the target lighting apparatus according to the request.

14 Claims, 8 Drawing Sheets

(51) Int. Cl.
   *G08G 1/087* (2006.01)
   *G08G 1/0965* (2006.01)
   *H04L 29/08* (2006.01)
   *G08G 1/005* (2006.01)
   *G08G 1/09* (2006.01)
   *G08G 1/00* (2006.01)
   *G08G 1/096* (2006.01)

(52) U.S. Cl.
   CPC ............. *G08G 1/091* (2013.01); *G08G 1/095* (2013.01); *G08G 1/096* (2013.01); *H04L 67/12* (2013.01); *H04W 4/44* (2018.02)

(56) References Cited

U.S. PATENT DOCUMENTS

2007/0073471 A1* 3/2007 Abe ................ G01C 21/32
                                                         701/532
2017/0347367 A1* 11/2017 Tandai ................ G08G 1/052
2019/0096242 A1* 3/2019 Gao .................. G08G 1/087

FOREIGN PATENT DOCUMENTS

| CN | 104167105 | 11/2014 |
| CN | 204706186 | 10/2015 |
| JP | 2012083996 | 4/2012 |

* cited by examiner

TRAFFIC INFORMATION INTERACTION SYSTEM AND TRAFFIC INFORMATION INTERACTION METHOD

CROSS-REFERENCE TO RELATED APPLICATION

This application claims the priority benefit of China application serial no. 201810599003.X, filed on Jun. 12, 2018. The entirety of the above-mentioned patent application is hereby incorporated by reference herein and made a part of this specification.

BACKGROUND OF THE INVENTION

1. Field of the Invention

The invention relates to an interaction system, and particularly relates to a traffic information interaction system.

2. Description of Related Art

In general, the conventional traffic signals for pedestrians merely use lighting signals to indicate whether paths corresponding to the current traffic signals for pedestrians are passable for pedestrians. Even though there are also audible signals indicators disposed at the traffic signals for deaf pedestrians, such audible signal indicators are unable to specifically indicate the duration currently remaining for passing or the time not passable. Besides, due to the popularity of smart mobile devices (or smart portable devices), pedestrians using smart mobile devices may easily overlook the traffic state at a nearby intersection when they look at the screens of the mobile devices.

Besides, conventionally, the pedestrians can use a button disposed below the traffic signal for pedestrians to notify the main controller that they intend to pass through the intersection corresponding to the traffic signal for pedestrians. However, such conventional method is not convenient for pedestrians using mobile devices, and pedestrians do not know whether the button has been pressed or not. Moreover, the driver driving a vehicle which is about to pass through the intersection does not know whether there is any pedestrian intending to pass through the intersection, either.

SUMMARY OF THE INVENTION

One or some exemplary embodiments of the invention provide a traffic information interaction system allowing a traffic signal for pedestrians or a lighting apparatus for a similar purpose to proactively push information about whether a corresponding path is passable or not to electronic devices nearby and allowing the electronic devices to clearly indicate whether a path corresponding to the lighting apparatus is passable or not through received information. In addition, the electronic device is further able to transmit a request of intending to pass a path to a corresponding lighting apparatus. Therefore, the lighting apparatus receiving the request correspondingly adjusts pushed information according to the request.

An embodiment of the invention provides a traffic information interaction system. The system includes a plurality of lighting apparatuses and a first electronic device. Each of the lighting apparatuses emits light according to received power, so as to indicate whether a corresponding path is passable with the emitted light. Each of the lighting apparatuses pushes information. The first electronic device generates a request according to information received by the first electronic device, and transmits the request to a target lighting apparatus of the lighting apparatuses. The target lighting apparatus adjusts target information pushed by the target lighting apparatus according to the request.

Based on the above, in the traffic information interaction system according to the embodiments of the invention, the traffic signal for pedestrians or a lighting apparatus for a similar purpose is able to determine the traffic state of the corresponding path according to the signal type of the currently received power. Then, the traffic signal or the lighting apparatus proactively pushes the information including the traffic state of the corresponding path and the corresponding remaining duration to the electronic devices nearby. The electronic device receiving the pushed information may perform the prompt operation, so as to indicate the traffic state of the path that the electronic device intends to enter and the remaining duration corresponding to the traffic state. Besides, the user of the electronic device transmits a request to the lighting apparatus through the input operation performed on the electronic device, so as to inform the lighting apparatus that the user intends to pass through the path corresponding to the lighting apparatus. The lighting apparatus further adjusts the information pushed by the lighting apparatus according to the received request, and transmits the request for changing the traffic state indicated by the lighting apparatus to the main controller, so as to change the traffic state indicated by the lighting apparatus. Besides, the electronic device disposed on the vehicle also determines whether to warn the driver that a pedestrian intends to pass through the path ahead according to the received pushed information.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1A:
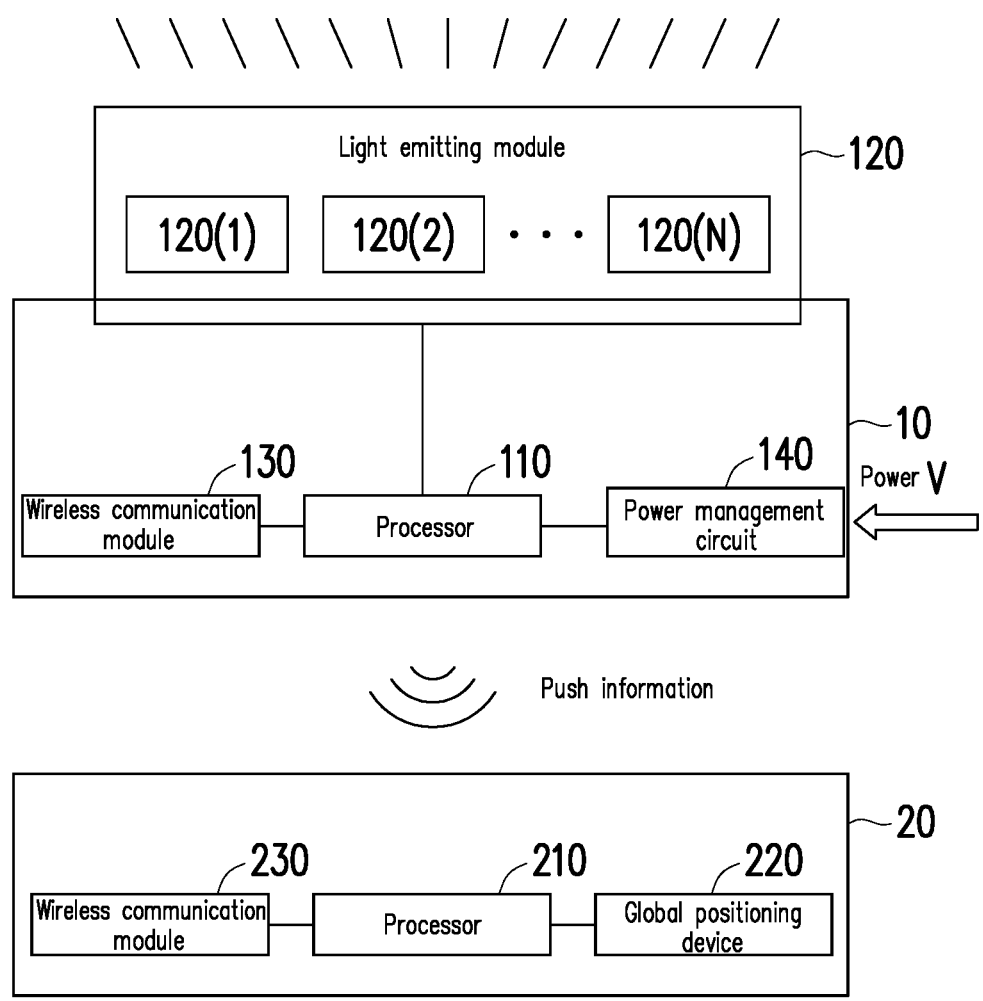
FIG. 1A is a schematic block diagram illustrating a traffic information interaction system according to an embodiment of the invention.

Reference will now be made in detail to the present preferred embodiments of the invention, examples of which are illustrated in the accompanying drawings. Wherever possible, the same reference numbers are used in the drawings and the description to refer to the same or like parts.

FIG. 1A is a schematic block diagram illustrating a traffic information interaction system according to an embodiment of the invention. Referring to FIG. 1A, the traffic information interaction system includes a lighting apparatus 10 and an electronic device 20. In the traffic information interaction system provided in the embodiment, the lighting apparatus 10 may proactively push lighting apparatus information to the electronic device 20 nearby, and the electronic device 20 may perform a corresponding prompt operation through the received lighting apparatus information (also referred to as pushed information).

The lighting apparatus 10 includes a processor 110, a light emitting module 120, a wireless communication module 130, and a power management circuit 140. In the embodiment, the processor 110 is coupled to the light emitting module 120, the wireless communication module 130, and the power management circuit 140. The electronic device 20 includes a processor 210, a global positioning device 220, and a wireless communication module 230. In the embodiment, the processor 210 is coupled to the global positioning device 220 and the wireless communication module 230.

In the embodiment, the lighting apparatus 10 may be any type of lighting apparatus or signal serving to indicate whether a corresponding path is passable or not. The lighting apparatus 10 may indicate whether the traffic state of the path corresponding to the lighting apparatus 10 is a passable state, a not passable state, or a warning prompt state with the light emitted by the light emitting module 120. The passable state indicates that the path corresponding to the lighting apparatus is currently passable. The not passable state indicates that the path corresponding to the lighting apparatus is currently not passable. The warning prompt state indicates that the current traffic state of the path corresponding to the lighting apparatus is about to change. Besides, the lighting apparatus 10 may further indicate a remaining duration corresponding to the current passable, not passable, or warning traffic state with the light emitted by the light emitting module 120, and the remaining duration is continuously being counted down. For example, a pedestrian or the driver of a vehicle may know that the path corresponding to the lighting apparatus is currently passable and the remaining duration (e.g., seconds) that the path is still passable. It should be noted that, to lower the cost, the lighting apparatus 10 of the embodiment does not need to be connected to a central control system (or a server) to be informed of the current traffic state or the corresponding remaining duration through a control signal or a command of the central control system.

The light emitting module 120 includes a plurality of light emitting elements 120(1) to 120(N). N is a positive integer. The light emitting devices are electronic devices capable of emitting light, such as light emitting diodes (LEDs), energy saving bulbs, fluorescent lamps, etc., and the colors of the light emitted by different light emitting elements 120(1) to 120(N) may be different. In the embodiment, the light emitting states and the shape of the arrangement of the light emitting elements 120(1) to 120(N) may serve to indicate whether the path corresponding to the lighting apparatus 10 is in the passable, not passable, or warning traffic state, and the remaining duration of the current traffic state.

The power management circuit 140 serves to receive power V provided by an external power source (e.g., city power supply), and the power V is supplied to the light emitting module 120 through different channels (power channels) of the power management circuit 140, so that the light emitting elements 120(1) to 120(N) receiving the power V emit light. For example, in a case where the power V corresponding to the first channel is received and the voltage level of the power V is a high level, the first light emitting element corresponding to the first channel may emit light (the power V is provided to the first light emitting element for light emission through the first channel). The power management circuit 140 may inform the processor 110 of the channel currently receiving the power V, i.e., transmitting the information about the channel receiving the power V to the processor 110.

The wireless communication modules 130 and 230 transmit or receive data through wireless communication. The wireless communication module 130 or 230 is, for example, one or a combination of circuits/chipsets supporting Global System for Mobile Communication (GSM) system, Personal Handy-phone System (PHS), Code Division Multiple Access (CDMA) system, Wireless Fidelity (WiFi) system, Worldwide Interoperability for Microwave Access (WiMAX) system, 3G, Long Term Evolution (LTE), Infrared (Infrared) transmission, Bluetooth (BT) communication technologies, and is not limited thereto. In the embodiment, the wireless communication module 130 is compatible with and makes use of a Bluetooth 4.0 communication protocol (BLE, Beacon, iBeacon) to push information, and the wireless communication module 230 is compatible with and makes use of a Bluetooth 4.0 communication protocol (BLE, Beacon, iBeacon) to receive/transmit the pushed information. It should be noted that the wireless communication module 130 and the wireless communication module 230 need not to be matched to each other. When the wireless communication module 130 pushes information, the wireless communication module 230 is able to automatically receive the pushed information.

In an embodiment, the wireless communication module 130 and/or the power management module 140 may be integrated with the processor 110 to form a module (also referred to as lighting apparatus controller).

The processors 110 and 210 are hardware components with a computing capability, and respectively serve to control the overall operations of the lighting apparatus 110 and the electronic device 20. Specifically, the processors 110 and 210 have a plurality of control commands. In addition, when the lighting apparatus 10 and the electronic device 20 are operating, these control commands are executed to perform corresponding management operations on the lighting apparatus 10 and the electronic device 20. In the embodiment, the processor 110 and the processor 210 are, for example, central processing units (CPUs), micro-processors or other programmable processing units, digital signal processors (DSP), programmable controllers, application specific integrated circuits (ASIC), programmable logic devices (PLD) or other similar circuit devices. However, the invention is not limited thereto.

The global positioning device 220 serves to transmit and receive a global positioning system (GPS) signal to detect (identify) position information (e.g., global two-dimensional coordinate values) of the electronic device 20. By continuously detecting and thereby obtaining the position information of the electronic device 20, the processor 210 may determine whether the electronic device 20 is continuously moving and identify the traveling direction (i.e., the direction in which the electronic device 20 moves) of the corresponding electronic device 20. In another embodiment, the electronic device 20 may also identify the traveling direction of the electronic device 20 with respect to different lighting apparatuses 10 by making use of the signal intensities (Beacon, iBeacon signal strength) of the wireless communication connections established with respect to the wireless communication modules 130 of different lighting apparatuses 10. In another embodiment, the electronic device 20 may also convert the signal intensities of the wireless communication connections established with respect to the wireless communication modules 130 of different lighting apparatuses 10 into relative distances between the electronic device 20 and the lighting apparatuses 10, so as to identify relative positions between the electronic device 20 and different lighting apparatuses 10.

It should be noted that the traffic information interaction system of the invention is not limited to the framework shown in FIG. 1A. In the following, the traffic information interaction system under another framework is described with reference to FIG. 1B. Also, the following only describes hardware components in FIG. 1B that are different from those in FIG. 1A.

Figure 1B:
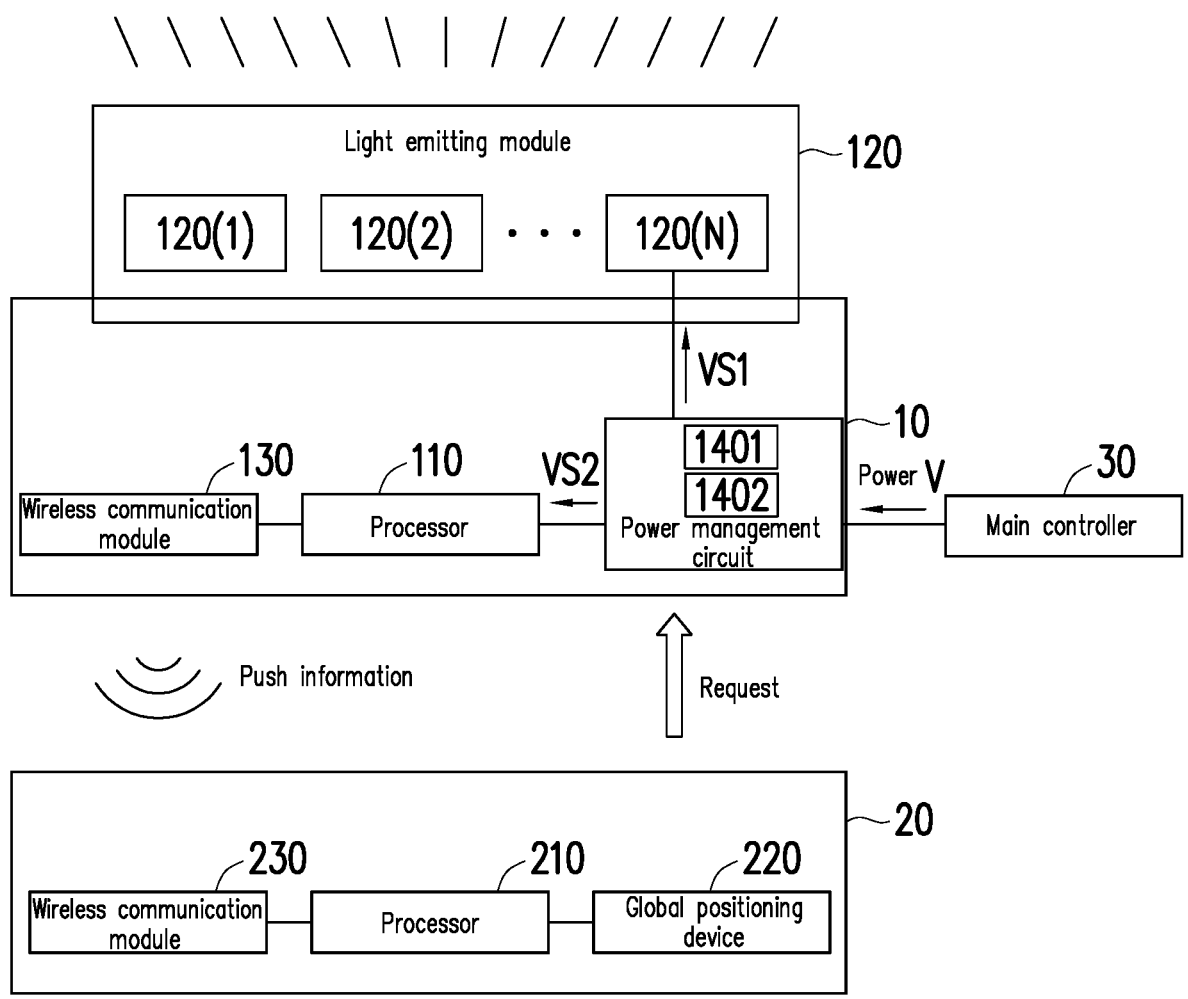
FIG. 1B is a schematic block diagram illustrating a traffic information interaction system according to an embodiment of the invention.

FIG. 1B is a schematic block diagram illustrating a traffic information interaction system according to an embodiment of the invention. Referring to FIG. 1B, the traffic information interaction system includes the lighting apparatus 10, the electronic device 20, and a main controller 30. In the traffic information interaction system provided in the embodiment, the lighting apparatus 10 may proactively push lighting apparatus information to the electronic device 20 nearby, and the electronic device 20 may perform a corresponding prompt operation through the received lighting apparatus information (also referred to as pushed information). In addition, the electronic device 20 may transmit a request to the lighting apparatus 10 (the lighting apparatus receiving the request may also be referred to as a target lighting apparatus), and the target lighting apparatus 10 may perform a corresponding operation, such as adjusting the pushed lighting apparatus information, according to the received request (the operation corresponding to the request will be described in subsequent paragraphs). The main controller 30 is coupled to the lighting apparatus 10 to provide the power V to the lighting apparatus 10.

As shown in FIG. 1B, the power management circuit 140 may respectively provide different electric power to the processor and the light emitting module according to the received power (electric power). In the embodiment, the power management circuit 140 includes power management sub-circuits 1401 and 1402. The main controller provides the power V to the lighting apparatus 10. Then, first electric power VS1 and second electric power VS2 for internal use are generated by the power management sub-circuits 1401 and 1402 in the lighting apparatus 10. The first electric power VS1 generated by the power management sub-circuit 1401 may be provided to the light emitting module 120 through different channels (power channels), so that the light emitting elements 120(1) to 120(N) receiving the first electric power VS1 may emit light. The power required for operating the processor 110 and the wireless communication module 130 is supplied with the second electric power VS2 generated by the power management sub-circuit 1402.

The power management circuit 140 may inform the processor 110 of the channel currently receiving the power V, i.e., transmitting the information about the channel currently used for receiving the power V to the processor 110. The first electric power VS1 and the second electric power VS2 are independent from each other. In other words, if an anomaly occurs in the supply of the first electric power VS1, the light emitting elements 120(1) to 120(N) do not emit light, but the second electric power VS2 may further be normally supplied to the processor 110 and the wireless communication module 130 to maintain the operation.

Figure 6:
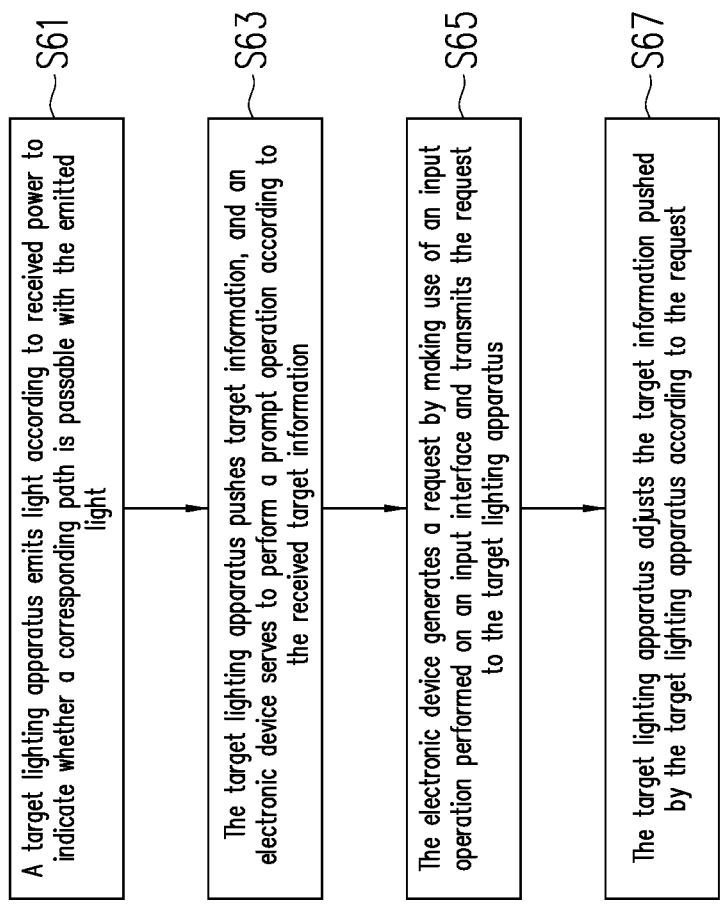
FIG. 6 is a flowchart illustrating an operation of a traffic information interaction system according to an embodiment of the invention.

FIG. 6 is a flowchart illustrating an operation of a traffic information interaction system according to an embodiment of the invention. Referring to FIG. 6, in the embodiment, the operation of the traffic information interaction system includes the following. At Step S61, the target lighting apparatus emits light according to the received power, so as to indicate whether the corresponding path is passable with the emitted light. At Step S63, the target lighting apparatus pushes the target information, and the electronic device performs a prompt operation according to the received target information. At Step S65, the first electronic device generates a request by using the input operation performed on an input interface, and transmits the request to the target lighting apparatus. In addition, at Step S67, the target lighting apparatus adjusts the target information pushed by the target lighting apparatus according to the request.

In the following, operating details of the traffic information interaction system provided in the embodiments of the invention will be described in detail with reference to the first embodiment and the second embodiment. The first embodiment mainly describes details about "the lighting apparatus (e.g., the target lighting apparatus) in the traffic information interaction system proactively pushes information (e.g., target information) to the nearby electronic device, so that the electronic device may perform a prompt operation according to the information pushed by the target lighting apparatus" (e.g., Steps S61 and 63). The second embodiment mainly describes details about "the electronic device in the traffic information interaction system transmits a request of intending to pass through a path to the target lighting apparatus corresponding to the path, and the target lighting apparatus adjusts the target information pushed by the target lighting apparatus or changes the traffic state of the target lighting apparatus according to the received request" (e.g., Steps S65 and S67).

First Embodiment

Figure 2:
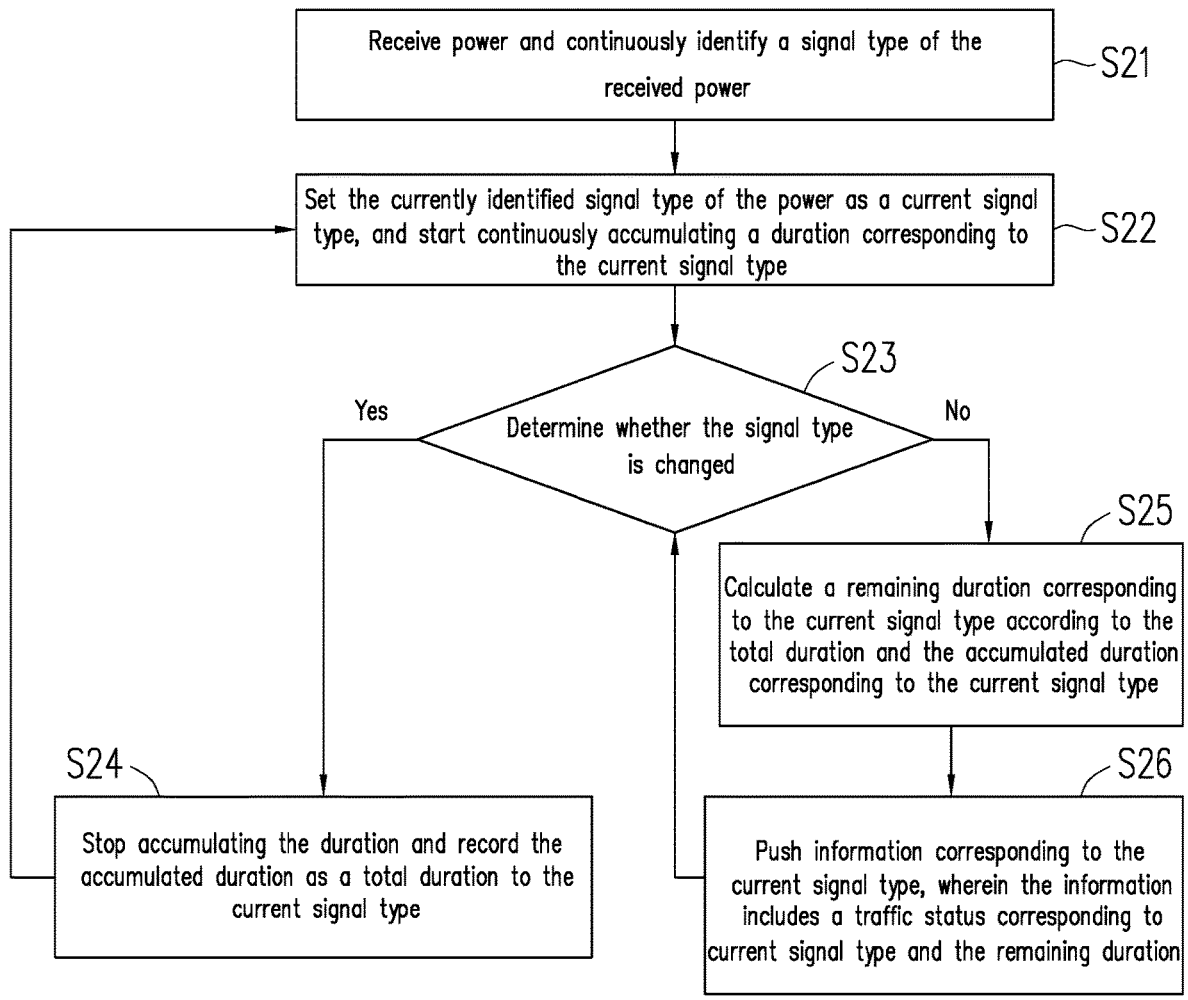
FIG. 2 is a flowchart illustrating an operation where a lighting apparatus pushes information according to an embodiment of the invention.

FIG. 2 is a flowchart illustrating an operation where a lighting apparatus pushes information according to an embodiment of the invention. Referring to FIG. 2, at Step S21, the power management circuit 140 receives the power V and continuously identifies the signal type of the received power V. Details in this regard will be described in the following with reference to FIG. 3.

Figure 3:
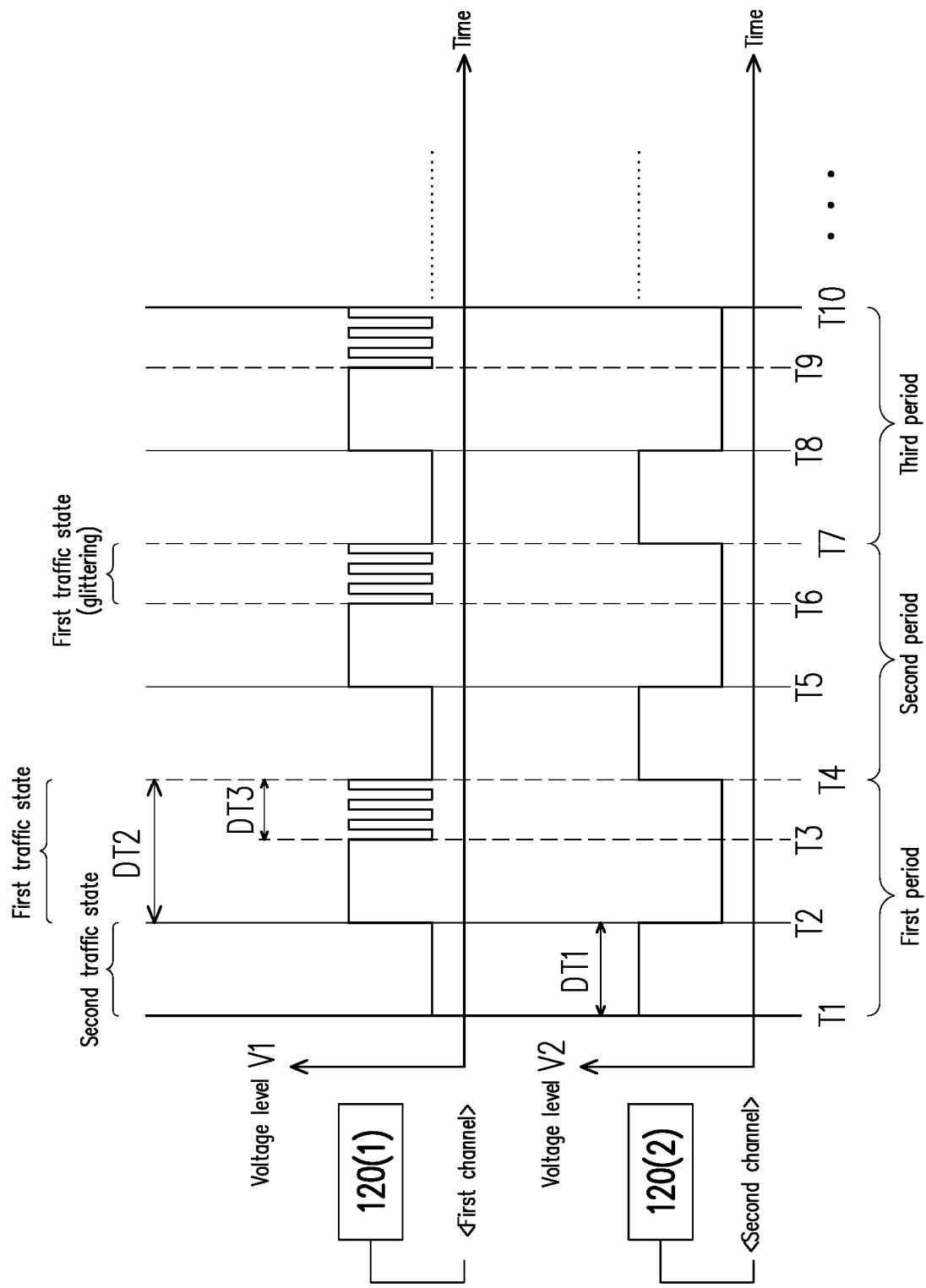
FIG. 3 is a schematic diagram illustrating signal types of power and corresponding traffic states according to an embodiment of the invention.

FIG. 3 is a schematic diagram illustrating signal types of power and corresponding traffic states according to an embodiment of the invention. Referring to FIGS. 1B and 3 at the same time, for example, the power management circuit 140 receives the power V via one (also referred to as a supply channel or a trigger channel) of the channels respectively corresponding to the light emitting elements of the light emitting module 120, generates the first electric power VS1 provided to the light emitting module 120 according to the power V, and provides the first electric power VS1 to one of the multiple light emitting elements of the light emitting module 120. The light emitting elements include the first light emitting element 120(1) and the second light emitting element 120(2), and the types include a first type and a third type corresponding to the first light emitting element 120(1) and a second type corresponding to the second light emitting element 120(2), and the multiple channels include a first channel corresponding to the first light emitting element 120(1) and a second channel corresponding to the second light emitting element 120(2).

In other words, as shown in the voltage waveform of a voltage level V1 of the power V corresponding to the first channel in FIG. 3, the voltage level V1 (the voltage level of the power V corresponding to the first channel) during a period from a time T1 to a time T2 is a low level (e.g., 0V), and the power management sub-circuit 1401 of the power management circuit 140 does not generate the first electric power VS1 to the first light emitting element 120(1) of the light emitting module 120 according to the power V corresponding to the first channel, so the first light emitting element 120(1) does not emit light. During a period from the time T2 to a time T3, the voltage level V1 is a high level, and the power management sub-circuit 1401 of the power management circuit 140 generates the first electric power VS1 to the first light emitting element 120(1) of the light emitting module 120 according to the power V corresponding to the first channel, so the first light emitting element 120(1) emits light. During a period from the time T3 to a time T4 (a duration DT3), the voltage level V1 is periodically varied between the high level and the low level, and the power management sub-circuit 1401 of the power management circuit 140 periodically generates the first electric power VS1 to the first light emitting element 120(1) of the light emitting module 120 according to the power V corresponding to the first channel, which is periodically varied between the high level and the low level. Therefore, the first light emitting element 120(1) emits light periodically (glittering periodically). The time during which the voltage level V1 is constantly at the high level may be considered as a duration DT2 (i.e., from the time T2 to the time T4). In another embodiment, a period from the time T3 to the time T4 is a glittering interval. At this time, the voltage level V1 may be considered as a high level, and the time that the first light emitting element 120(1) continuously emits light is the duration DT2.

Also, as shown in the voltage waveform of a voltage level V2 of the power V corresponding to the second channel in FIG. 3, the voltage level V2 (the voltage level of the power V corresponding to the second channel) during the period from the time T1 to the time T2 is a high level, and the power management sub-circuit 1401 of the power management circuit 140 generates the first electric power VS1 to the second light emitting element 120(2) of the light emitting module 120 according to the power V corresponding to the second channel, so the second light emitting element 120(2) emits light. During the period from the time T2 to the time T4 (the duration DT2), the voltage level V2 is a low level, and the power management sub-circuit 1402 of the power management circuit 140 does not generate the first electric power VS1 to the second light emitting element 120(2) of the light emitting module 120 according to the power V corresponding to the second channel, so the second light emitting element 120(2) does not emit light.

During the period from the time T1 to the time T2 (a duration DT1), the power management circuit 140 may determine that the trigger channel of the power V is the second channel, and determine that the current signal type is the second type. During the period from the time T2 to the time T3, the power management circuit 140 may determine that the trigger channel of the power V is the first channel, and determine that the current signal type is the first type.

When the power management circuit 140 determines that the trigger channel of the power V is still the first channel, and the voltage level V1 of the power V is varied periodically between the high level and the low level, it may be determined that the signal type of the power V is the third type. According to an embodiment of FIG. 3, the period from the time T3 to the time T4 (a duration DT3) demonstrates the third type of the signal type.

If the current signal type is the first type or the third type, the power management sub-circuit 1401 of the power management circuit 140 generates the first electric power VS1 to the first light emitting element 120(1) of the light emitting module 120, so the first light emitting element 120(1) continuously emits light or glitters periodically and indicates that the corresponding path is in a first traffic state. If the current signal type is the second type, the power management sub-circuit 1402 of the power management circuit 140 generates the first electric power VS1 to the second light emitting element 120(2) of the light emitting module 120, so the second light emitting element 120(2) emits light and indicates that the corresponding path is in a second traffic state. In the embodiment, the first traffic state is a passable state, for example, and the light emitted by the first light emitting element 120(1) is green light that is constantly on or glittering green light, for example. The green light indicates that the corresponding path is passable. The second traffic state is a not passable state, for example, and the light emitted by the second light emitting element 120(2) is red light that is constantly on, for example. The red light indicates that the corresponding path is not passable.

It should be noted that the duration/pattern of the power V provided to each channel may be periodical (repetitive/circulative). For example, the pattern of the power V in a second period and a third period is the same as that of a first period, and it may be considered that the power V with the pattern of the first period is received by the power management circuit 140 one period after another. With the power V being circulatively supplied to the first channel and the second channel, the lighting apparatus 10 is able to regularly emit different light according to the time to indicate whether the corresponding path is passable.

Returning to FIG. 2, at Step S22, the processor 110 sets the signal type currently identified as the current signal type, and starts accumulating the duration corresponding to the current signal type. Specifically, the processor 110 may identify that the current signal type is the first type, the second type, or the third type through the power management circuit 140, and sets the current signal type to be the first type, the second type, or the third type that is identified. It should be noted that, regarding the operation of identifying the current signal type by the power management circuit 140, the signal type is continuously identified when the power V is received. In addition, the identification result is transmitted to the processor 110, so that the processor 110 may continuously set/be informed of the current signal type.

In the embodiment, when the processor 110 determines that the current signal type is changed to another signal type (e.g., the current signal type is changed from the second type to the first type, from the first type to the third type, or from the third type to the second type), the processor 110 starts accumulating the duration corresponding to the current signal type. In other words, the processor 110 may constantly record the duration that each current signal type lasts.

Taking FIG. 3 as an example, at the time T1, the power management circuit 140 identifies that the signal type of the power V is the second type. The processor 110 thus sets the current signal type as the second type, and starts accumulating the duration of the second type. At the time T2, the power management circuit 140 identifies that the signal type of the power V is changed to the first type. The processor 110 thus stops accumulating the duration corresponding to the second time and obtains the duration DT1 (T2-T1) corresponding to the second type. Then, the processor 110 starts accumulating the duration corresponding to the first type. At the time T3, the power management circuit 140 identifies that the signal type of the power V is changed to the third type. The processor 110 then stops accumulating the duration corresponding to the first type and obtains the duration (T3-T2) corresponding to the first type. Then, the processor 110 starts accumulating the duration corresponding to the third type. At the time T4, the power management circuit 140 identifies that the signal type is changed from the third type to the second type and obtains the duration DT3 (T4-T3) corresponding to the third type.

At Step S23, the processor 110 determines whether the current signal type is changed. As described above, the processor 110 determines whether the current signal type is changed by identifying the current trigger channel through the power management circuit 140.

If the processor 110 determines that the current signal type is changed, at Step S24 of the embodiment, the processor 110 stops accumulating the duration and records the accumulated duration as the total duration corresponding to the current signal type. Specifically, if the current signal type is changed, the processor 110 stops accumulating the duration corresponding to the current signal type before the change, and records the accumulated duration as the total duration corresponding to the current signal type before the change. The processor 110 may store the total duration to a suitable storage device, such as a buffer storage device. Then, the flow continues with Step S22, the processor 110 adopts the signal type after the change as the new current signal type, and restarts accumulating the duration corresponding to the current signal type again.

If the processor 110 determines that the current signal type is not changed at Step S23, the flow continues with Step S25. At Step S25, the processor 110 calculates the remaining duration corresponding to the current signal type according to the total duration and the accumulated duration corresponding to the current signal type. Specifically, the processor 110 reads the total duration corresponding to the current signal type (e.g., reading the total duration corresponding to the current signal type as the first type) from the storage device, subtracts the accumulated duration corresponding to the current signal type from the read total duration, and adopts the difference obtained as the remaining duration corresponding to the current signal type.

For example, assuming that the total duration corresponding to the current signal type as the first type read by the processor 110 is 30 seconds and the currently accumulated duration corresponding to the first type is 5 seconds, at this time, the processor 110 obtains that the remaining duration corresponding to the first type has 25 seconds (30 seconds–5 seconds). In other words, the processor 110 learns for how much remaining duration longer will the power V of the first type lasts according to the previously recorded total duration corresponding to the first type and the currently accumulated duration corresponding to the first type.

Then, at Step S26, the processor 110 pushes information corresponding to the current signal type. The information includes the traffic state corresponding to the current signal type and the remaining duration. Specifically, the processor 110 may identify the corresponding traffic state according to the current signal type, and the processor 110 may push the traffic state corresponding to the current signal type and the remaining duration to the nearby electronic device 20 through the wireless communication module 130 after calculating the remaining duration corresponding to the current signal type. In the embodiment, the processor 110 pushes the information at a scale of seconds. In other words, the processor 110 instructs the wireless communication module 130 to push the generated information including the traffic state and the remaining duration every second or every predetermined seconds.

Then, returning to Step S23, the processor 110 resumes to determine whether the current signal type is changed and continuously accumulates the corresponding duration and calculates the remaining duration.

In another embodiment, the processor 110 may determine whether the corresponding total duration has been recorded when setting the current signal type (after Step S21). If yes, the processor 110 starts counting down the total duration continuously in a second-by-second manner, so as to obtain the remaining duration that decreases through time. The processor 110 pushes the traffic state corresponding to the current signal type and the obtained remaining duration through the wireless communication module 130. In another embodiment, if the processor 110 determines that the corresponding total duration is not recorded, the processor 110 starts accumulating the corresponding duration to obtain and record the total duration corresponding to the current signal type when the current signal type is changed.

It should be noted that the operation of determining and recording the total durations corresponding to different signal types may also be referred to as signal type learning operation. In other words, when the processor 110 performs the signal type learning operation, the processor 110 may learn and record the total duration of each signal type according to the duration and the changing time point of the signal type of the received power V, and apply the recorded total duration to calculating the remaining duration, thereby pushing the information corresponding to the path more efficiently.

In the following, the operation flow of the electronic device receiving the pushed information is described in detail with reference to FIG. 4.

Figure 4:
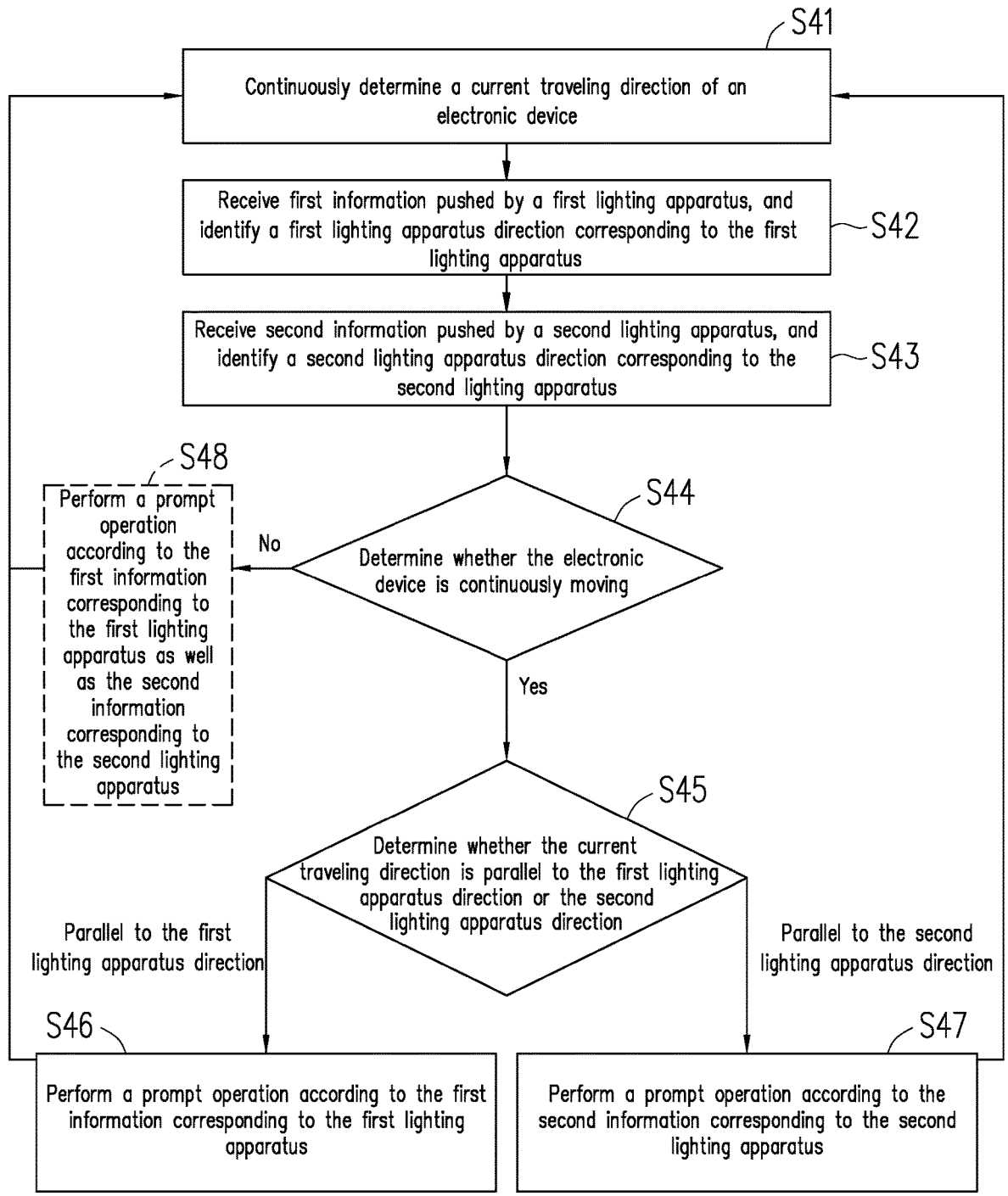
FIG. 4 is a flowchart illustrating an operation where an electronic device performs a prompt operation according to received information according to an embodiment of the invention.
Figure 5:
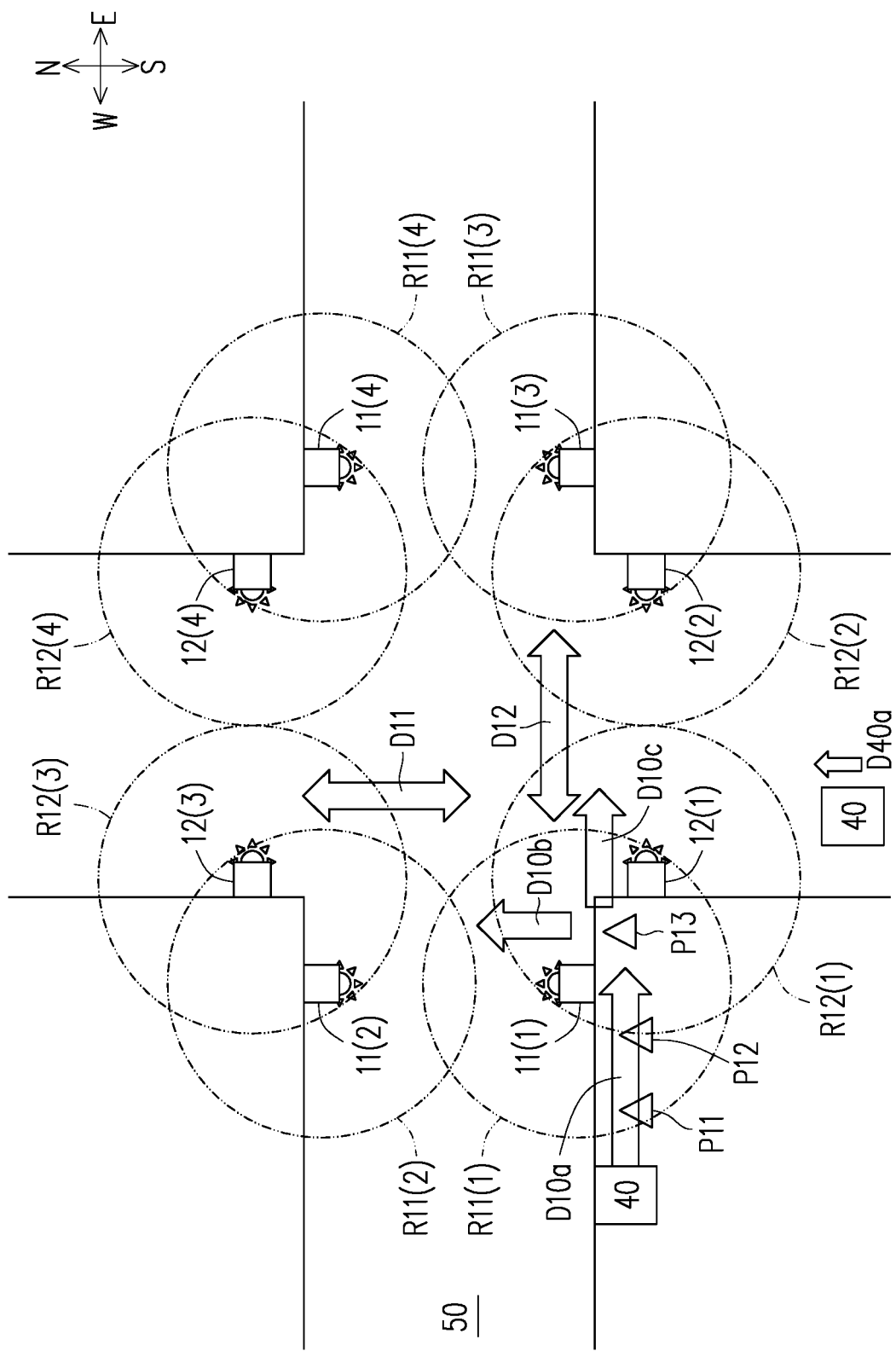
FIG. 5 is a schematic aerial view illustrating determining whether a traveling direction of an electronic device is parallel to a lighting apparatus direction corresponding to received information according to an embodiment of the invention.

FIG. 4 is a flowchart illustrating an operation where an electronic device performs a prompt operation according to received information according to an embodiment of the invention. FIG. 5 is a schematic aerial view illustrating determining whether a traveling direction of an electronic device is parallel to a lighting apparatus direction corresponding to received information according to an embodiment of the invention.

Referring to FIG. 4, at Step S41, the processor 210 continuously determines the current traveling direction of the electronic device 20.

For example, referring to FIG. 5, it is assumed that two sets of lighting apparatuses, i.e., lighting apparatuses 11(1) to 11(4) and lighting apparatuses 12(1) to 12(4) are mounted at the intersection of a road 50, the lighting apparatuses 11(1) to 11(4) push the same information, and the lighting apparatuses 12(1) to 12(4) push the same information. The pushing ranges of the lighting apparatuses 11(1) to 11(4) are pushing ranges R11(1) to R11(4), and the pushing ranges of the lighting apparatuses 12(1) to 12(4) are pushing ranges R12(1) to R12(4). For example, the pushing range R11(1) is a pushing range with the lighting apparatus 11(1) as the center that meets the Bluetooth 4.0 protocol (Beacon, iBeacon). In other words, electronic devices within the pushing range R11(1) can receive the information pushed by the lighting apparatus 11(1). Also, as shown in FIG. 5, it is assumed that the upper, lower, left and right of the aerial view are respectively the north (N), south (S), west (W), and east (E).

A lighting apparatus direction corresponding to the lighting apparatuses 11(1) to 11(4) is a first lighting apparatus direction D11, and a lighting apparatus direction corresponding to the lighting apparatuses 12(1) to 12(4) is a second lighting apparatus direction D12. The lighting apparatus direction serves to indicate the direction of the path indicated by the corresponding lighting apparatus. For example, the first lighting apparatus direction D11 represents a reciprocal path direction between the side of the road at the lighting apparatus 11(1) and the side of the road at the lighting apparatus 11(2), and may also represent a reciprocal path direction between the side at the lighting apparatus 11(3) and the side at the lighting apparatus 11(4). For another example, the second lighting apparatus direction D12 represents a reciprocal path direction between the side at the lighting apparatus 12(1) and the side at the lighting apparatus 12(2), and may also represent a reciprocal path direction between the side at the lighting apparatus 12(3) and the side at the lighting apparatus 12(4).

In this example, the processor 210 continuously learns position changes of the electronic device 20 in the background according to the position information of the electronic device 20 detected by the global positioning device 220, so as to identify that the traveling direction (moving direction) of the electronic device 20 is D10a. As an alternative, the traveling direction and the lighting apparatus direction may be represented in azimuth angles, and are not limited to the above.

Then, at Step S42, the processor 210 receives first information pushed by the first lighting apparatus 11(1) through the wireless communication module 230 and identifies the first lighting apparatus direction D11. For example, when the electronic device 20 passes through a position P11, the electronic device 20 enters the pushing range R11(1) and starts receiving the first information pushed by the lighting apparatus 11(1). Since the position of the first lighting apparatus 11(1) is closer to the electronic device 20, the processor 210 identifies that the first lighting apparatus direction D11 is perpendicular to the traveling direction D10a.

Then, if the electronic device 20 continues traveling in the traveling direction D10a, at Step S43, the processor 210 receives second information pushed by the second lighting apparatus 12(1) through the wireless communication module 230, and identifies the second lighting apparatus direction D12. For example, when the electronic device 20 passes through a position P12, the electronic device 20 enters the pushing range R12(1) and starts receiving the second information pushed by the lighting apparatus 12(1). The processor 210 identifies that the second lighting apparatus direction D12 is parallel to the traveling direction D10a. At this time, since the electronic device 20 is still within the pushing range R11(1), the electronic device 20 still continuously receives the first information that is pushed.

Then, at Step S44, the processor 210 determines whether the electronic device 20 is continuously moving.

Specifically, after receiving the first information and the second information, the processor 210 continuously determines whether the electronic device 20 is continuously moving. If yes, at Step S45, the processor 210 may determine whether the current traveling direction is parallel to the first lighting apparatus direction D11 or the second lighting apparatus direction D12. Specifically, the processor 210 determines whether the currently identified traveling direction is parallel to the first lighting apparatus direction D11 or the second lighting apparatus direction D12 set previously. For example, if the current traveling direction identified is a traveling direction D10b, the processor 210 determines that the current traveling direction is parallel to the first lighting apparatus direction D11, and if the current traveling direction identified is a traveling direction D10c, the processor 210 determines that the current traveling direction is parallel to the second lighting apparatus direction D12.

In another embodiment, after receiving the pushed information of the first lighting apparatus 11(1) and the second lighting apparatus 12(1), the processor 210 determines a relationship between the currently identified traveling direction (also referred to as a third traveling direction) and a first traveling direction or a second traveling direction, where the first traveling direction is the first lighting apparatus direction D11 and the second traveling direction is the second lighting apparatus direction D12. For example, if it is determined that the third traveling direction is changed from D10a to D10b, the processor 210 determines that the currently identified third traveling direction is parallel to the first lighting apparatus direction D11 and perpendicular to the second lighting apparatus direction D12. If it is determined that the third traveling direction is constantly from D10a to D10c, the processor 210 determines that the currently identified third traveling direction is parallel to the second lighting apparatus direction D12 and perpendicular to the first lighting apparatus direction D11.

It should be noted that, in yet another embodiment, the information received by the processor 210 includes an unique identification (UID) of the lighting apparatus pushing the information. For example, the first information pushed by the first lighting apparatus 11(1) includes a first UID of the first lighting apparatus 11(1). In addition, the processor 210 may identify the first lighting apparatus direction D11 according to the first UID of the first lighting apparatus 11(1), and identify the second lighting apparatus direction D12 according to a second UID of the second lighting apparatus 12(1). For example, referring FIG. 5 where the upper of the aerial view is assumed to be north, the first lighting apparatus direction D11 is a north-south direction, and the second lighting apparatus direction D12 is an east-west direction at this time. In this another embodiment, UIDs of the lighting apparatuses 11(1) to 11(4) contain a set of identification codes for indicating lighting apparatuses in specific directions. For example, the UIDs of the lighting apparatuses 11(1) to 11(4) contain an identification code "NS" indicating that the lighting apparatuses 11(1) to 11(4) are lighting apparatuses in the first lighting apparatus direction (north-south direction) D11. Also, UIDs of the lighting apparatuses 12(1) to 12(4) contain another identification code "EW" indicating that the lighting apparatuses 12(1) to 12(4) are lighting apparatuses in the second lighting apparatus direction (east-west direction) D12. In this way, the processor 210 is able to identify whether the currently identified traveling direction is the north-south direction or the east-west direction. Then, the processor 210 may display the traffic information of the first lighting apparatus direction D11 or the second lighting apparatus direction D12 parallel to the currently identified traveling direction on an electronic device 10. For example, if the traveling direction is the north-south direction parallel to the first lighting apparatus direction D11, the processor 210 may display the pushed information of the first lighting apparatus 11(1) corresponding to the first lighting direction D11. It should be noted that the invention is not limited to the example. For example, in still another embodiment, the processor 210 may identify reference information such as the position of the lighting apparatus, the lighting apparatus direction, etc., directly according to the UID of the lighting apparatus, and identify the relative relationship between the path corresponding to the lighting apparatus and the current electronic device 10, thereby further determining the lighting apparatus and the pushed information corresponding to the path that the user intends to pass through.

Returning to FIG. 4, at Step S45, if the processor 210 determines that the current traveling direction is parallel to the first lighting apparatus direction D11, the flow continues with Step S46, where the processor 210 performs a prompt operation according to the first information corresponding to the first lighting apparatus 11(1). If the processor 210 determines that the current traveling direction is parallel to the second lighting apparatus direction D12, the flow continues with Step S47, where the processor 210 performs a prompt operation according to the second information corresponding to the second lighting apparatus 12(1).

In other words, if the current traveling direction is determined to be parallel to the first lighting apparatus direction D11, the processor 210 determines that the electronic device 20 is about to pass through the path between the first lighting apparatus 11(1) and the first lighting apparatus 11(2) and thus adopts the first information pushed by the first lighting apparatus 11(1) to perform the prompt operation. If the current traveling direction is determined to be parallel to the second lighting apparatus direction D12, the processor 210 determines that the electronic device 20 is about to pass through the path between the second lighting apparatus 12(1) and the second lighting apparatus 12(2) and thus adopts the second information pushed by the second lighting apparatus 12(1) to perform the prompt operation. Then, the operation flow returns to Step S41. The electronic device 20 determines the current traveling direction and continues receiving the information pushed by the lighting apparatus 10. Also, the electronic device 20 determines the adoptable pushed information by determining whether the traveling direction of the electronic device 20 is parallel to a lighting apparatus direction.

Besides, if the processor 210 receives information pushed by a third lighting apparatus that is completely identical to the second information currently used by the electronic device 20, the information pushed by the third lighting apparatus is viewed as new second information, and the third lighting apparatus is set as a new second lighting apparatus. Also, new and different pushed information received afterwards is viewed as new first information, and a fourth lighting apparatus transmitting the information is set as a new first lighting apparatus. For example, if the traveling direction is the second traveling direction D12, when the electronic device 20 enters the pushing range R12(2) from the pushing range R12(1) and starts receiving the information pushed by the third lighting apparatus 12(2), since the pushed information of the third lighting apparatus 12(2) is the same as the second information pushed by the second lighting apparatus 12(1), the information pushed by the third lighting apparatus 12(2) is viewed as new second information, and the third lighting apparatus 12(2) is viewed as a new second lighting apparatus. Then, when the electronic device 20 enters the pushing range R11(3) and starts receiving the first information pushed by the fourth lighting apparatus 11(3), this information (differing from the currently used second information) is viewed as new first information, and the fourth lighting apparatus 11(3) is viewed as a new first lighting apparatus. The same logic applies to other lighting apparatuses, pushing ranges, pushed information, etc. According to the above, the received first information or second information may include the traffic state corresponding to the first lighting apparatus 11(1) or the second lighting apparatus 12(1) and the corresponding remaining duration. Assuming that the processor 210 performs the prompt operation according to the first information, the processor 210 firstly identifies the traffic state of the received first information and the corresponding remaining duration. If the traffic state is the passable state (the first traffic state), the processor 210 counts down the remaining duration corresponding to the passable state, and the processor 210 generates a sound signal or a graphic signal to indicate the remaining duration being counted down. For example, the processor 210 may generate an audible signal to make a sound through the speaker of the electronic device 20, and the sound corresponds to the current traffic state and the remaining duration being counted down. For example, the speaker of the electronic device 20 may produce a speech sequence of "remaining passable time 20 seconds" to indicate that it is currently the passable state and there are still 20 seconds remaining for passing. Alternatively, the processor 210 may generate a graphic signal to display an image through the screen of the electronic device 20. The image corresponds to the current traffic state and the remaining duration currently being counted down. For example, the screen of the electronic device 20 may display a number "20" in green to indicate that it is currently the passable state and there are still 20 seconds remaining for passable. As the remaining duration is being counted down, the duration is also reflected in the speech sequence/sounds produced or the image displayed by the electronic device 20.

If the traffic state is the not passable state, the processor 210 instructs the electronic device 20 to generate a reminder sound or vibrate, counts down the remaining duration of the not passable state, and generates another audible signal or another graphic signal to indicate the remaining duration being counted down. Differing from the example of the passable state, when the traffic state is the not passable state, the processor 210 may make the electronic device 20 additionally generate the reminder sound or vibrate to more specifically remind that the path that the electronic device 20 currently intends to pass is not passable.

For example, when it is identified that the traffic state is the not passable state, the electronic device 20 vibrates. Then, the speaker of the electronic device 20 generates a speech sequence of "not passable for 20 seconds" to indicate that it is currently the not passable state and there are still 20 seconds remaining for the not passable state, or the screen of the electronic device 20 displays a number "20" in red to indicate that it is currently the not passable state and there are still 20 seconds remaining for the not passable state.

In an embodiment, when the traffic state is changed, the processor 210 may further make the electronic device 20 generate an additional reminder sound or vibrate.

If the processor 210 determines that the electronic device 20 is not continuously moving at Step S44, the processor 210 may perform the prompt operation according to the first information corresponding to the first lighting apparatus 11(1) as well as the second information corresponding to the second lighting apparatus 12(1) at Step S48. For example, when the electronic device 20 stays at a position P13, and the processor 210 determines that the electronic device 20 is not continuously moving, the processor 210 makes the screen of the electronic device 20 simultaneously display the traffic states and the remaining durations respectively corresponding to different lighting apparatus directions. Moreover, the screen may display the corresponding lighting apparatus directions.

In the following, how the electronic device 20 proactively transmits a request to the lighting apparatus 10 is described with reference to the second embodiment. Since the hardware components of the second embodiment are the same as those of the first embodiment, features and functions of the respective hardware components same as those in the first embodiment will not be repeated in the second embodiment.

Second Embodiment

In the embodiment, the electronic device 20 provides an input interface for the user of the electronic device 20 to perform an input operation on the input interface to generate a corresponding request. The generated request is transmitted to the lighting apparatus 10 through the wireless communication module 230. The input interface includes a passing request input interface. The passing request input interface is a first virtual button displayed on the screen, for example, and the first virtual button may be displayed as a button in a pressed state and a button in a not pressed state. When the processor 210 disables the passing request input interface, the corresponding first virtual button is displayed as the pressed state, and is not triggered by the user's touch operation. When the processor 210 enables (not disables) the passing request input interface, the corresponding first virtual button is displayed as the not pressed state, and can be triggered by the user's touch operation. When the processor 210 determines that the first virtual button (the passing request input interface) is triggered, the processor 210 generates a passing request and transmits the generated passing request to the lighting apparatus (also referred to as the target lighting apparatus). The passing request serves to indicate the path (also referred to as the target path) corresponding to the target lighting apparatus that the user of the electronic device 20 intends to pass. The target lighting apparatus includes a lighting apparatus meeting one of the following conditions: (1) the lighting apparatus closest to the electronic device 20; (2) the lighting apparatus whose lighting apparatus direction is parallel to the traveling direction of the electronic device 20; and (3) the lighting apparatus to which the electronic device 20 is directed (e.g., the lighting apparatus toward which the user shakes the electronic device 20). When the target lighting apparatus receives the passing request, the target lighting apparatus may perform a corresponding operation according to the received passing request and the traffic state of the path corresponding to the current target lighting apparatus. As described in the first embodiment, the target lighting apparatus pushes the target information to the electronic device 20. In the embodiment, the target information further includes a button trigger state. The button trigger state is set in default to be an untriggered state. The button trigger state serves to inform the electronic device receiving the target information whether the target lighting apparatus has received any passing request (including the passing request from the electronic device 20 or other electronic devices). For example, the "untriggered state" of the button trigger state serves to indicate that the current target lighting apparatus has not received any passing request, while the "triggered state" of the button trigger state serves to indicate that the target lighting apparatus has received a passing request (the triggered state here may also serve to indicate that the target lighting apparatus has processed the passing request).

Figure 7:
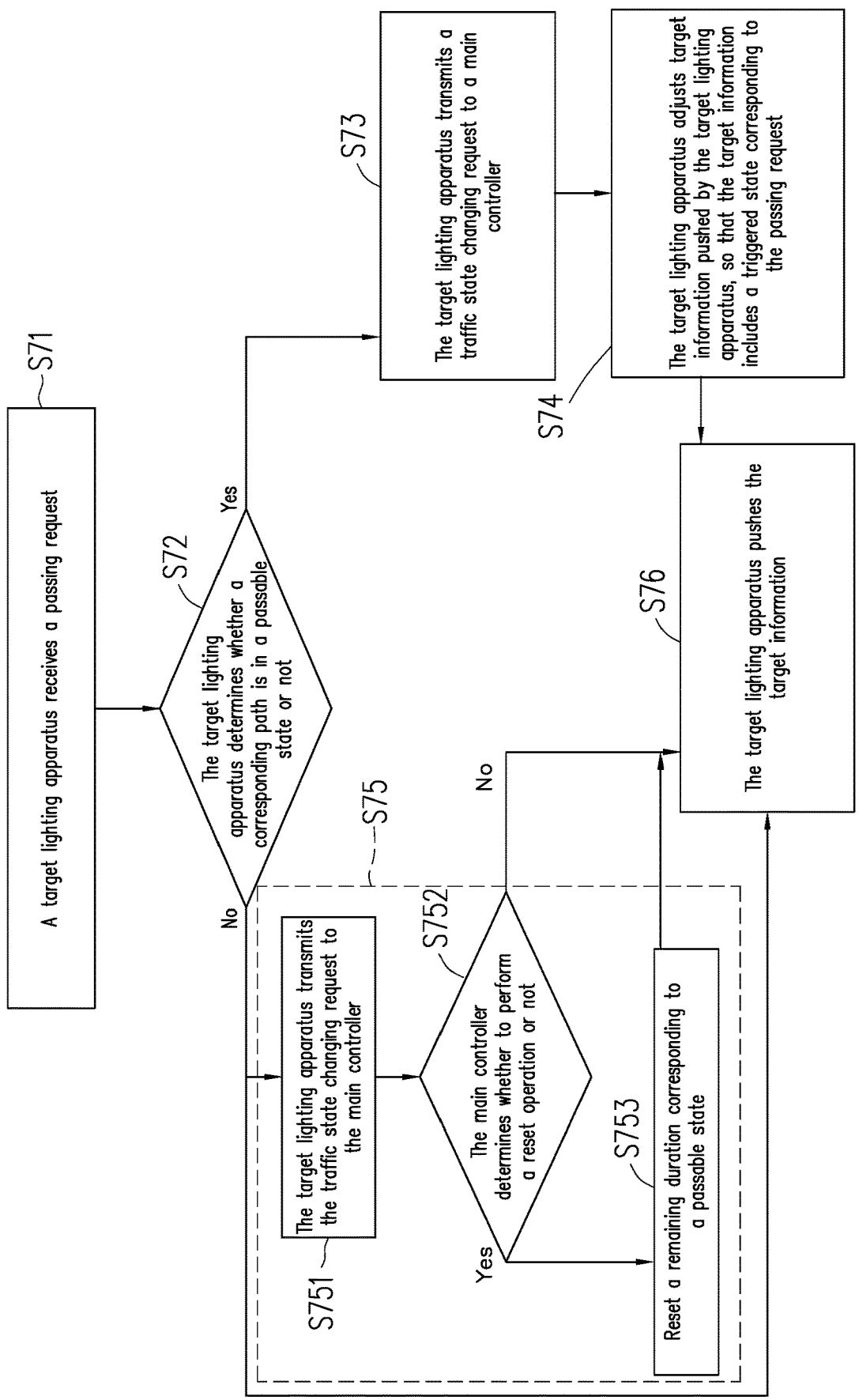
FIG. 7 is a flowchart illustrating an operation of a lighting apparatus in response to a received passing request.

FIG. 7 is a flowchart illustrating an operation of a lighting apparatus in response to a received passing request. Referring to FIG. 7, at Step S71, the target lighting apparatus receives the passing request. Then, the target lighting apparatus performs a subsequent operation (e.g., Step S72, Step S73, Step S75, Step S76), according to the received passing request and the current traffic state of the corresponding path.

For example, it is assumed that the path corresponding to the target lighting apparatus 10 is in the not passable state ("Yes" in Step S72). When the target lighting apparatus 10 receives the passing request and determines that the corresponding path is in the not passable state, the target lighting apparatus 10 may transmit a traffic state changing request to the main controller 30 (Step S73).

Then, the target lighting apparatus 10 adjusts the target information pushed by the target lighting apparatus, so that the target information includes the triggered state corresponding to the passing request (Step S74). Specifically, if the current traffic state of the corresponding path is the not passable state, when a passing request has been received and processed, the button trigger state in the target information pushed by the target lighting apparatus is set as the triggered state. If the passing request has not been received, the button trigger state in the target information pushed by the target lighting apparatus 10 is set as the untriggered state. In this way, the electronic device 20 (the processor 210) receiving the target information with the triggered state may learn that the target lighting apparatus 10 has received the previously transmitted passing request. In addition, other electronic devices receiving the target information may also learn that the target lighting apparatus 10 has received the passing request.

In the embodiment, the processor 210 may disable or enable the passing request input interface according to the different button trigger states in the received target information. For example, when the button trigger state in the target information received by the electronic device 20 is the triggered state, the electronic device 20 disables the passing request input interface. When the button trigger state in the target information received by the electronic device 20 is the untriggered state, the electronic device 20 enables the passing request input interface. In other words, if the target lighting apparatus 10 has received a passing request and the current traffic state of the corresponding path is the not passable state, the button trigger state in the target information subsequently pushed by the target lighting apparatus 10 is the triggered state. Accordingly, the processor 210 disables the passing request input interface, and the user of the electronic device receiving the target information is unable to transmit another passing request through the passing request input interface.

In an embodiment, the main controller 30 may also reply to the target lighting apparatus 10 with confirmation information after receiving the traffic state changing request, so that the target lighting apparatus 10 (the processor 110) learns that the main controller 30 has received the traffic state changing request. Accordingly, the target lighting apparatus 10 may adjust the pushed target information. For example, the button trigger state in the target information is set as the triggered state. Here, the triggered state serves to indicate that the target lighting apparatus 10 has processed the passing request.

Regarding the communication transmission between the target lighting apparatus 10 and the main controller 30, the traffic state changing request may be transmitted in a wired or wireless manner. More specifically, it is assumed that the processor 110 is coupled to the main controller 30. In other words, the processor 110 and the main controller 30 are connected through wired connection, such as wired connection established through a power line or a signal line. The processor 110 may transmit the traffic state changing request to the main controller 30 through the wired connection in the wired manner. In other words, the main controller 30 and the processor may interact with each other through the wired connection. Alternatively, it is assumed that the processor 110 is not coupled to the main controller 30. In other words, there is no wired connection between the processor 110 and the main controller 30. However, the processor 110 may establish wireless connection with the wireless communication module of the main controller 30 through the wireless control module 130 in a wireless manner. Then, the processor 110 may transmit the traffic state changing request to the main controller 30 through the wireless connection. In other words, the main controller 30 and the processor 110 may interact with each other through the wireless connection.

It should be noted that when the traffic state of the target lighting apparatus is changed from the not passable state to the passable state, the target lighting apparatus also adjusts the button trigger state in the pushed target information to be the untriggered state.

Alternatively, in an embodiment, if the current traffic state of the corresponding path is the passable state (i.e., the traffic state of the corresponding path is not the not passable state) and the target lighting apparatus 10 has received the passing request ("No" at Step S72), the flow continues with Step S76, where the target lighting apparatus 10 pushes the target information. In other words, the target lighting apparatus 10 does not perform the corresponding operation according to the received passing request.

It should be noted that, in another embodiment (as indicated by the square frame in a dotted line at Step S75), if the current traffic state of the corresponding path is the passable state (i.e., the traffic state of the corresponding path is not the not passable path) and the target lighting apparatus 10 receives the passing request ("No" at Step S72), the target lighting apparatus 10 may perform Steps S751 to S753 At Step S751, the target lighting apparatus 10 transmits the traffic state changing request to the main controller 30 (same as Step S73). At this time, the traffic state changing request received during the passable state may trigger the main controller into performing a reset operation on passable duration, so as to increase the passable duration.

For example, assuming that the path corresponding to the target lighting apparatus 10 is currently in the passable state, the target lighting apparatus 10 may transmit the traffic state changing request to the main controller 30 after receiving the traffic state changing request of the first virtual button, and the main controller 30 may determine whether to perform the reset operation according to an arbitrarily designed reset count value (Step S752).

Specifically, when the main controller 30 determines that the reset count value is lower than a reset threshold ("Yes" at Step S752), the main controller 30 resets the remaining duration corresponding to the passable state (Step S753) and accumulates the reset count value. The reset count value serves to indicate the number of times of performing the reset operation in a passable state. In addition, the performed reset operation also includes transmitting the power V corresponding to the passable state to the target lighting apparatus 10 again. Then, the target lighting apparatus 10 pushes the target information according to the reset remaining duration (which may be considered as that the remaining duration is being counted down all over again) and the passable state (e.g., Step S76). In other words, the target information is affected by the passing request.

Alternatively, when the main controller 30 determines that the reset count value is greater than the reset threshold value ("No" at Step S752), the main controller 30 determines not to perform the reset operation, and the flow continues with Step S76. In other words, the remaining duration corresponding to the current passable state is still being counted down continuously (without being reset or counted down all over again), and the target information is correspondingly updated and pushed (but the target information is not affected by the passing request).

It should be noted that, in this another embodiment, whether the main controller 30 performs the reset operation or not, the target lighting apparatus still accurately updates and pushes the target information according to the result of performing/not performing the reset operation.

In the embodiment, the electronic device 20 is also switchable between a vehicle mode and a pedestrian mode. When the electronic device 20 is in the pedestrian mode (also referred to as the first electronic device), the electronic device 20 may provide an input interface for the user to perform an input operation on the input interface to transmit a request for informing the lighting apparatus that the user intends to pass through the corresponding path. When the electronic device 20 is in the vehicle mode (also referred to as the second electronic device), the electronic device 20 does not provide the input interface, so the user is unable to transmit the request for informing the lighting apparatus that the user intends to pass through the corresponding path through the input interface (e.g., the passing request input interface).

In the embodiment, when the button trigger state in the target information received by the second electronic device from the target lighting apparatus 10 is the triggered state, the second electronic device learns that there is a user intending to pass through the target path corresponding to the target lighting apparatus. Accordingly, the second electronic device may perform a warning prompt operation. The warning prompt operation includes displaying text or graphic information or playing a voice warning. The warning prompt operation serves to indicate that there is a person who is about to pass through the target path corresponding to the target lighting apparatus 10 ahead of the vehicle (in which the second electronic device is disposed).

For example, referring to FIG. 5, assuming that the path corresponding to the second lighting apparatus 12(1) is currently in the not passable state, the first electronic device 20 transmits the passing request to the second lighting apparatus 12(1), and a second electronic device 40 is disposed in a vehicle which is about to pass through the path corresponding to the second lighting apparatus 12(1) in a traveling direction D40a, the second lighting apparatus 12(1) adjusts the pushed information in response to the received passing request, so that the pushed information includes the information with the button trigger state as the triggered state.

When the second electronic device 40 enters the pushing range R12(1) of the second lighting apparatus 12(1), the second electronic device 40 receives the information including the triggered state, and the second electronic device 40 performs the warning prompt operation. In this way, the user of the second electronic device 40 may learn that there is a user intending to pass through the path ahead corresponding to the second lighting apparatus 12(1).

In an embodiment, the input interface further includes a reporting request input interface. The reporting request input interface is a second virtual button displayed on the screen, for example, and the second virtual button may be displayed as a button in a pressed state and a button in a not pressed state. When the processor 210 disables the reporting request input interface, the corresponding second virtual button is displayed as the pressed state, and cannot be triggered by the user's touch operation. When the processor 210 enables (not disables) the reporting request input interface, the corresponding second virtual button is displayed as the not pressed state, and can be triggered by the user's touch operation. When the processor 210 determines that the second virtual button (the reporting request input interface) is triggered, the processor 210 generates a reporting request and transmits the generated reporting request to the lighting apparatus (also referred to as the target lighting apparatus). The reporting request serves to indicate that the target lighting apparatus is anomalous. In other words, when the user of the electronic device 20 finds that the target lighting apparatus is anomalous, the user may use the reporting request input interface to generate the reporting request to the target lighting apparatus, so as to report the anomaly of the target lighting apparatus. When the target lighting apparatus receives the reporting request, the target lighting apparatus may perform an operation, such as turning off the display mode of the target lighting apparatus or additionally sending anomaly information to the main controller 30, according to the received reporting request.

More specifically, the information pushed by the lighting apparatus further includes a report state. The report state is set in default to be an unreported state. The report state serves to indicate whether the corresponding target lighting apparatus has been reported as being anomalous. When the report state is in the unreported state, the report state serves to indicate that the corresponding target lighting apparatus is not reported as being anomalous. When the report state is in the reported state, the report state serves to indicate that the corresponding target lighting apparatus has been reported as being anomalous.

When receiving the reporting request, the target lighting apparatus adjusts the target information pushed by the target lighting apparatus according to the request. Specifically, assuming that the current report state is the default unreported state, upon receiving the reporting request, the processor 110 changes the report state in the target information to be pushed from the unreported state to the reported state, and then pushes the target information.

When the report state in the target information received by the first electronic device is the reported state, the first electronic device disables the reporting request input interface. Alternatively, when the report state in the target information received by the first electronic device is the unreported state, the first electronic device enables the reporting request input interface. In other words, if the target lighting apparatus has been reported as being anomalous, the user of the electronic device is unable to report the anomaly of the target lighting apparatus again through the reporting request input interface. Alternatively, when the target lighting apparatus receives the reporting request, the target lighting apparatus may turn off the display by itself or transmit the report information to the main controller 30. When the main controller 30 receives the anomaly information from the target lighting apparatus 10, the main controller 30 may perform one or a combination of the following anomaly management operations: (1) controlling the power V provided to the target lighting apparatus, so that the target lighting apparatus enters a light emitting mode emitting a special pattern, where the light emitting mode with the special pattern indicates that the target lighting apparatus is currently anomalous (e.g., glittering with a fixed interval or continuously not emitting light); (2) transmitting the anomaly information to the maintenance unit/staff of the target lighting apparatus. Besides, the main controller 30 may further transmit confirmation information to the target lighting apparatus, so that the target lighting apparatus learns that the anomaly information has been processed.

Besides, in the case where the target lighting apparatus turns off its light emission on its own due to an anomaly report, the target lighting apparatus can still normally push the state and time (e.g., the target information) of the path corresponding to the target lighting apparatus, so that the processor 210 of the first electronic device 20 receiving the target information can still correctly display relevant information on the first electronic device according to the target information. Besides, the determination and functioning of the first virtual button are also normal (i.e., the first virtual button is not affected by whether or not the target lighting apparatus is anomalous), so the first virtual button is still able to assist the pedestrian to pass through the path when the display of the lighting apparatus is turned off.

It should be noted that, in the embodiment, the processor 210 is further able to determine whether to disable or enable the reporting request input interface and the passing request input interface according to a moving speed of the first electronic device 20 and a relative distance with respect to the target lighting apparatus.

For example, if the processor 210 determines that the moving speed of the first electronic device 20 is greater than a predetermined speed or the relative distance between the first electronic device 20 and the target lighting apparatus is greater than a predetermined distance, the first electronic device 20 (the processor 210) disables the reporting request input interface and the passing request input interface. Alternatively, if the processor 210 determines that the moving speed of the first electronic device 20 is not greater than the predetermined speed or the relative distance between the first electronic device 20 and the target lighting apparatus is not greater than the predetermined distance, the first electronic device 20 (the processor 210) enables the reporting request input interface and the passing request input interface.

In view of the foregoing, in the traffic information interaction system according to the embodiments of the invention, the traffic signal or the lighting apparatus for a similar purpose is able to determine the traffic state of the corresponding path according to the currently received signal type, and is able to accumulate the total durations and remaining durations corresponding to different traffic states. Then, the traffic signal or the lighting apparatus proactively pushes the information including the traffic state of the corresponding path and the remaining duration to the electronic devices nearby. The electronic device receiving the pushed information determines whether the current traveling direction of the device is parallel to the lighting apparatus direction corresponding to the received information to perform the prompt operation and thereby indicate the traffic state of the path that the electronic device intends to enter and the remaining duration corresponding to the traffic state.

Therefore, when the display of the lighting apparatus is anomalous (e.g., some of the light emitting elements are malfunctioning), the system is still able to provide the pedestrians with the correct traffic state and reduce traffic accidents. Besides, the user of the electronic device can transmit a request to the lighting apparatus through the input operation performed on the electronic device, so as to inform the lighting apparatus that the user intends to pass through the path corresponding to the lighting apparatus. The lighting apparatus further adjusts the information pushed by the lighting apparatus according to the received request, and transmits the request for changing the traffic state indicated by the lighting apparatus to the main controller, so as to change the traffic state indicated by the lighting apparatus. Besides, the electronic device disposed on the vehicle also determines whether to warn the driver that a pedestrian intends to pass through the path ahead according to the received pushed information.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A traffic information interaction system, comprising:
a plurality of lighting apparatuses, wherein each of the lighting apparatuses emits light according to received power and indicates whether a corresponding path is passable with the emitted light; and
a first electronic device,
wherein each of the lighting apparatuses pushes information, the first electronic device generates a request according to information received by the first electronic device, and transmits the request to a target lighting apparatus of the lighting apparatuses, and
wherein the target lighting apparatus adjusts target information pushed by the target lighting apparatus according to the request,
wherein the information pushed by each of the lighting apparatuses comprises a button trigger state, and the button trigger state is set in default to be an untriggered state.

2. The traffic information interaction system as claimed in claim 1, wherein the first electronic device performs a prompt operation according to the received information, and generates the request through an input operation performed on an input interface.

3. The traffic information interaction system as claimed in claim 1, wherein each of the lighting apparatuses comprises a wireless communication module for pushing the information and receiving the request.

4. The traffic information interaction system as claimed in claim 1, further comprising a main controller coupled to and providing the power to the lighting apparatuses, wherein the target lighting apparatus transmits a traffic state changing request to the main controller according to the request.

5. The traffic information interaction system as claimed in claim 1, wherein each of the lighting apparatuses comprises a power management circuit, and the power management circuit generates first electric power and second electric power according to the power.

6. The traffic information interaction system as claimed in claim 5, wherein the first electric power is connected to a light emitting module, and the second electric power is connected to a processor and a wireless communication module.

7. The traffic information interaction system as claimed in claim 1,
wherein the information pushed by each of the lighting apparatuses further comprises a traffic state and a remaining duration.

8. The traffic information interaction system as claimed in claim 1, wherein when the received request is a passing request, and the traffic state in the target information indicates a passable state,
the target lighting apparatus determines whether to perform a reset operation according to a reset count value,
wherein if the reset count value is lower than a reset threshold, the target lighting apparatus performs the reset operation to reset the remaining duration corresponding to the passable state, and
wherein if the reset count value is not lower than the reset threshold, the target lighting apparatus does not perform the reset operation.

9. The traffic information interaction system as claimed in claim 8, wherein if the reset count value is not lower than the reset threshold and the target lighting apparatus does not perform the reset operation, the button trigger state in the pushed target information is set to be a triggered state.

10. The traffic information interaction system as claimed in claim 8, wherein when the traffic state of the target lighting apparatus is changed from the passable state to a not passable state, the target lighting apparatus sets the reset count value to zero.

11. The traffic information interaction system as claimed in claim 1, wherein when the button trigger state in the target information received by the first electronic device is a triggered state, the first electronic device disables a passing request input interface, and wherein when the button trigger state in the target information received by the first electronic device is the untriggered state, the first electronic device enables the passing request input interface.

12. The traffic information interaction system as claimed in claim 1, wherein the information pushed by each of the lighting apparatuses further comprises a report state, and the report state is set in default to be an unreported state.

13. The traffic information interaction system as claimed in claim 12, wherein when the report state in the target information received by the first electronic device is a reported state, the first electronic device disables a reporting request input interface, and wherein when the report state in the target information received by the first electronic device is the unreported state, the first electronic device enables the reporting request input interface.

14. The traffic information interaction system as claimed in claim 1, further comprising:
a second electronic device, disposed in a vehicle and receiving the information pushed by the lighting apparatuses,
wherein when the button trigger state in the target information received by the second electronic device from the target lighting apparatus is a triggered state, the second electronic device performs a warning prompt operation.

* * * * *